United States Patent [19]
Liao

[11] Patent Number: 5,466,051
[45] Date of Patent: Nov. 14, 1995

[54] RELEASABLE WHEEL ASSEMBLY FOR GOLF CART

[75] Inventor: Gordon Liao, Taipei, Taiwan

[73] Assignee: Unique Product & Design Co., Ltd., Tainan Hsien, Taiwan

[21] Appl. No.: 269,802

[22] Filed: Jun. 30, 1994

[51] Int. Cl.[6] .................................................. B60B 35/02
[52] U.S. Cl. ............................ 301/111; 301/112; 301/131
[58] Field of Search ....................................... 301/111, 112, 301/114, 115, 121, 122, 124.1, 126, 131, 118, 120, 125

[56] References Cited

U.S. PATENT DOCUMENTS

| | | | |
|---|---|---|---|
| 937,171 | 10/1909 | Patten | 301/121 |
| 3,672,743 | 6/1972 | Pompey | 301/112 |
| 3,740,100 | 6/1973 | Perego | 301/121 |
| 5,277,480 | 1/1994 | Chiu | 301/111 |

FOREIGN PATENT DOCUMENTS

| | | | |
|---|---|---|---|
| 2607754 | 6/1988 | France | 301/112 |
| 1505849 | 4/1969 | Germany | 301/111 |
| 4201745 | 1/1993 | Germany | 301/111 |
| 2238277 | 5/1991 | United Kingdom | 301/111 |

*Primary Examiner*—Russell D. Stormer
*Attorney, Agent, or Firm*—Pro-Techtor International

[57] ABSTRACT

A wheel device for releasably attaching to a golf cart, the wheel device includes an engaging member fixed to a wheel axle. A pair of catches are extended from tile engaging member. The leg attachment member includes a hole for receiving the catches of the engaging member so as to secure the wheel to the leg attachment member. The wheel device includes a greatly simplified structure, and the wheel can be easily secured to the leg attachment member.

2 Claims, 7 Drawing Sheets

RELEASABLE WHEEL ASSEMBLY FOR GOLF CART

BACKGROUND OF THE INVENTION

1. Field of the Invention

The present invention relates to a wheel assembly, and more particularly to a releasable wheel assembly for golf cart.

2. Description of the Prior Art

The closest prior art of which applicant is aware is his prior U.S. Pat. No. 5,029,946, entitled "RELEASABLE WHEEL ASSEMBLY FOR GOLF CART". The structure of this patent is shown in FIGS. 1 to 3 herein and comprises a frame member 4 including an opening 41 formed therein for receiving a pressing mechanism 5. The mechanism 5 includes a knob 51 having an extension 52 extended inwards of the opening 41. A spring 54 biases the knob 51 outward of the opening 41. A wheel member 3 includes a rod 31 extended therefrom for engaging with an aperture 42 of the frame member 4. The rod 31 includes an annular groove 311 for engaging with an orifice 53 of the extension 52. The rod 31 is secured in the aperture 42 when the knob 51 is biased outward by the spring 54, best shown in FIG. 2. However, when the knob 51 is depressed inwards of the opening 41, the rod 31 may be disengaged from the orifice 53 such that the wheel member 3 may be easily disengaged from the frame member 4. The wheel assembly includes a complicated configuration that is adverse for manufacturing and assembling purposes.

The present invention has arisen to mitigate and/or obviate the afore-described disadvantages of the conventional golf cart wheel assemblies.

SUMMARY OF THE INVENTION

The primary objective of the present invention is to provide a releasable wheel assembly for a golf cart which includes a greatly simplified configuration for facilitating assembling operation of the wheel to the golf cart.

In accordance with one aspect of the invention, there is provided a releasable wheel assembly for a golf cart comprising a wheel body including a hub portion, an axle rotatably supported in the hub portion, a leg attachment member including a hole formed therein, and an engaging member fixed to the axle and including a pair of catches extended therefrom for engaging with the hole of the catches so as to secure the wheel body to the leg attachment member.

The catches each includes a tapered free end and a depression formed therein, tile hole of the leg attachment member includes a projection means provided therein for engaging with the depression of the catches so as to retain the catches in the hole.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
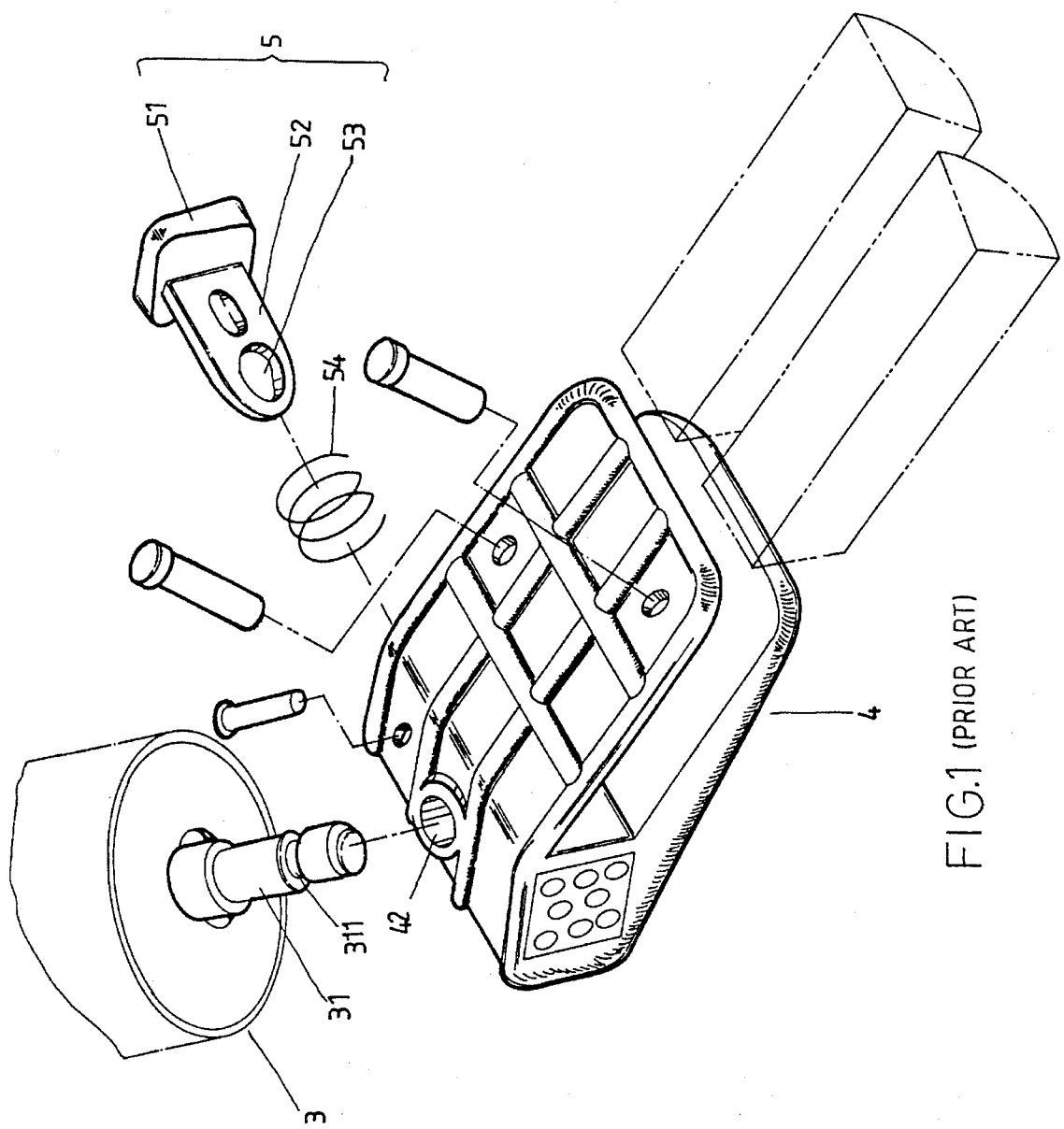
FIG. 1 is an exploded view of a typical wheel assembly for golf cart.
Figure 2:
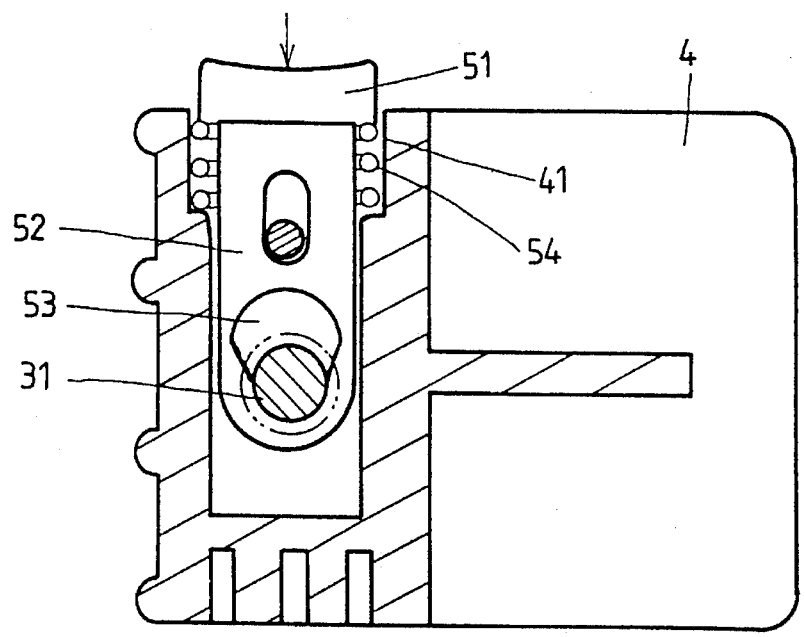
FIGS. 2 and 3 are cross sectional views of the typical wheel assembly.
Figure 3:
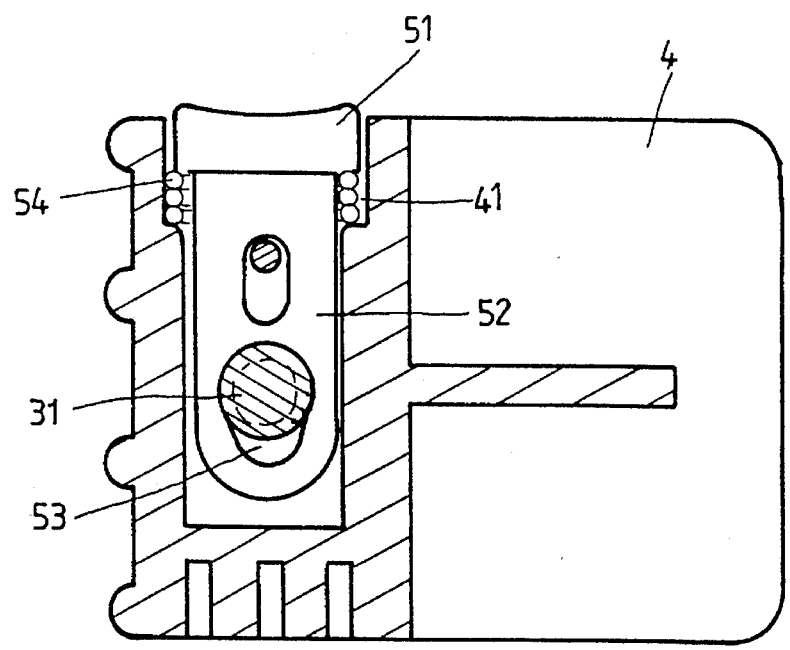
Figure 4:
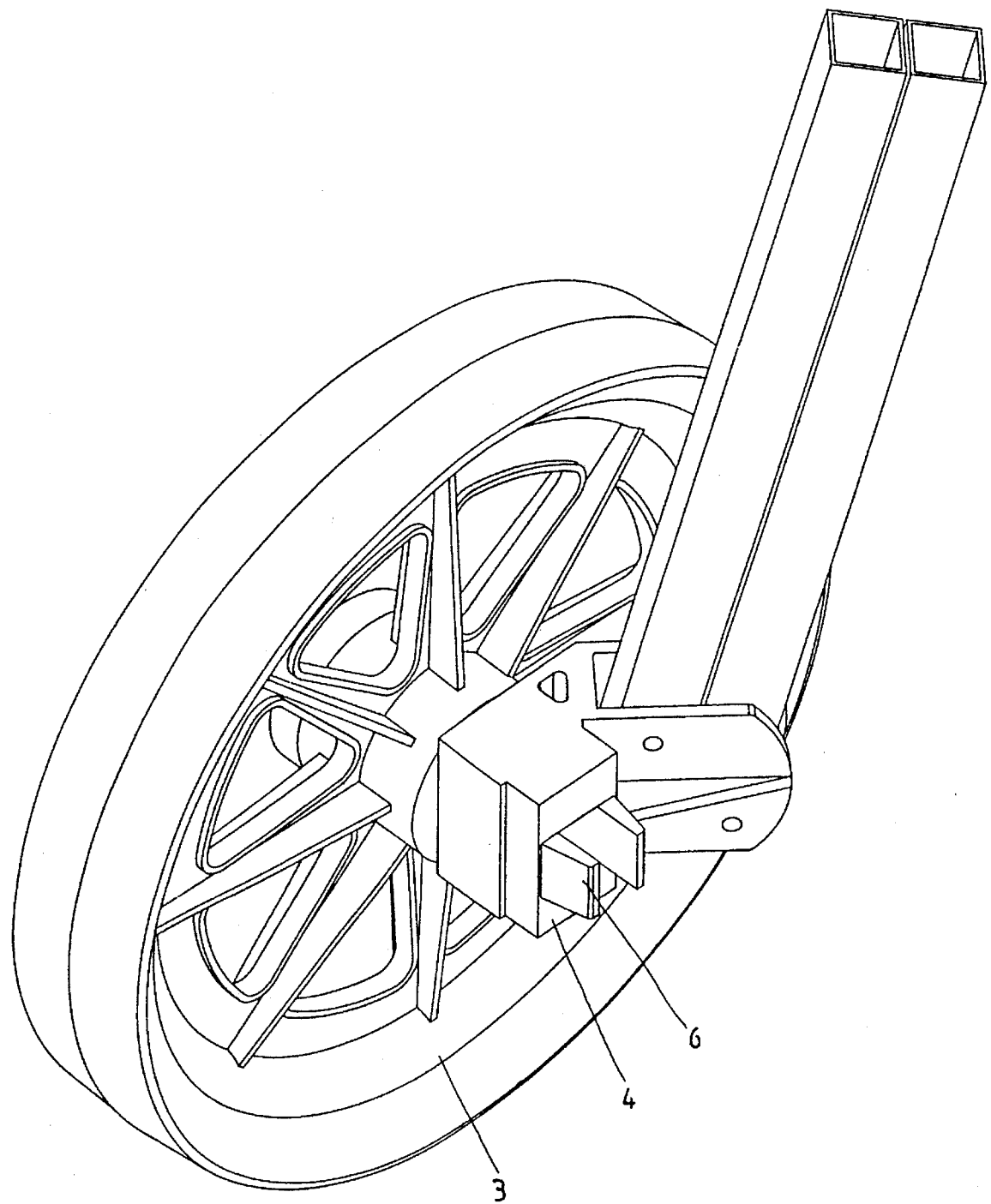
FIG. 4 is a perspective view of a releasable wheel assembly for golf cart of the invention.
Figure 5:
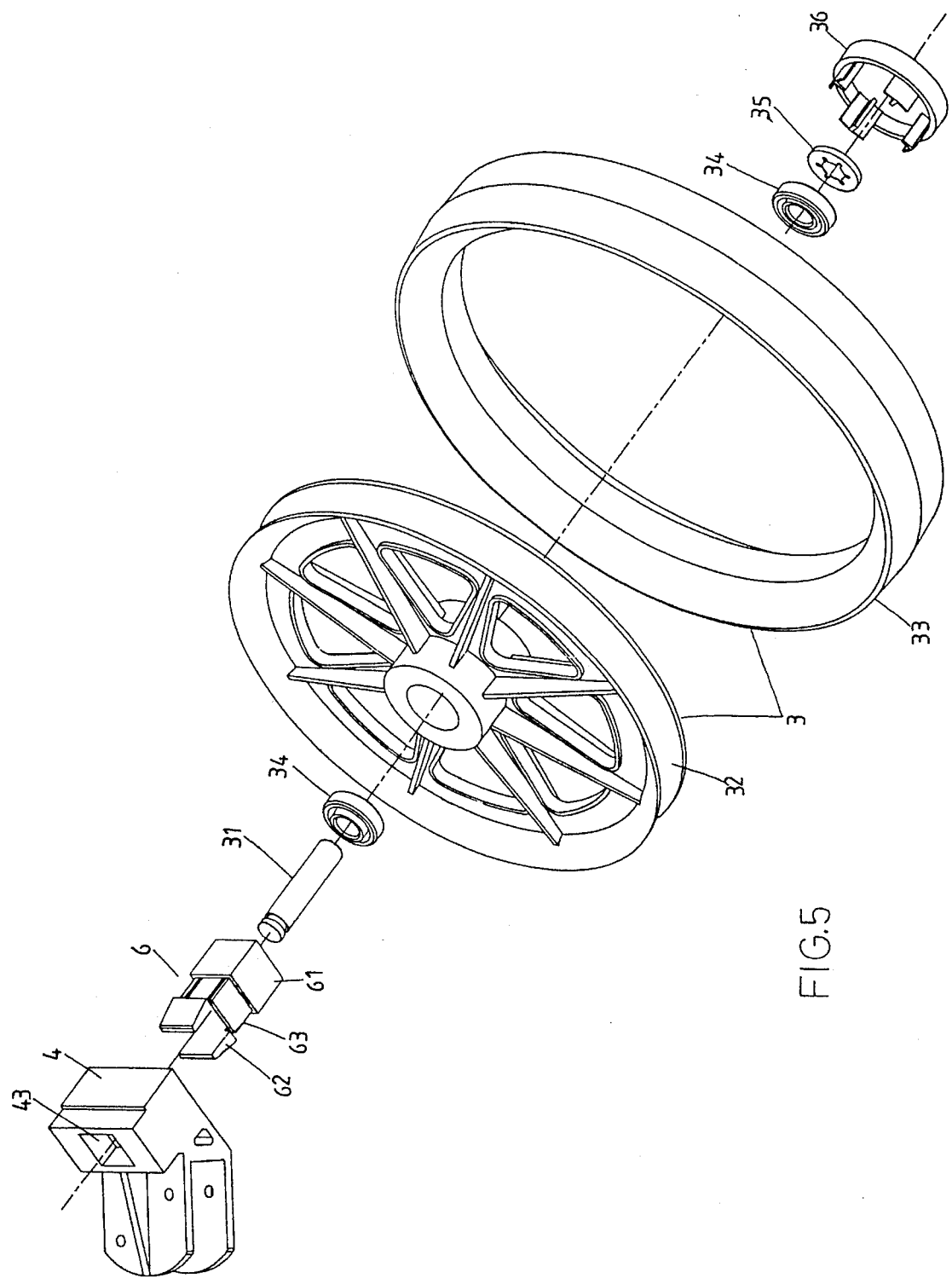
FIG. 5 is an exploded view of the wheel assembly as shown in FIG. 4.
Figure 6:
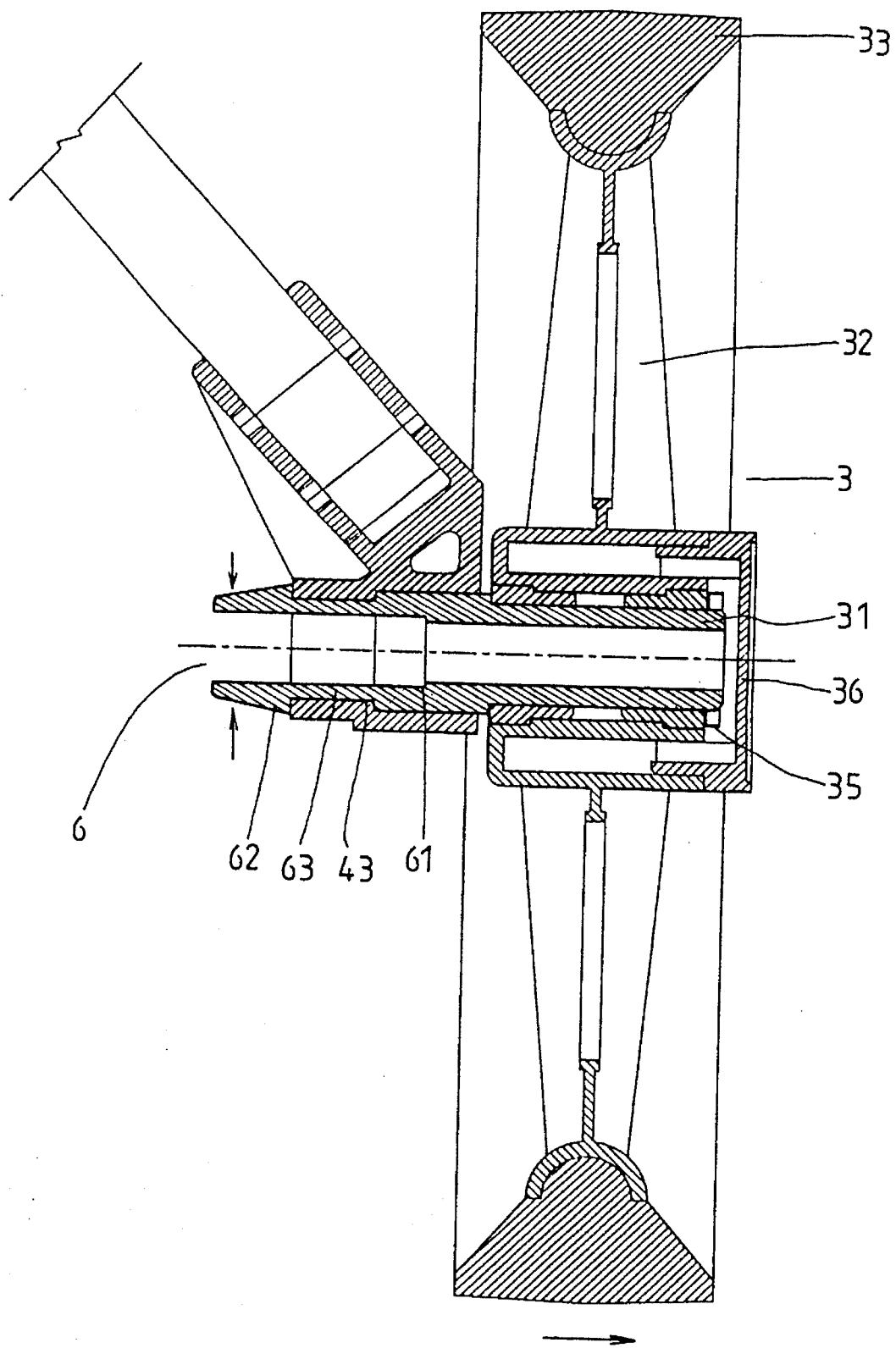
FIG. 6 is a cross sectional view of the wheel assembly as shown in FIG. 4.

Referring to the drawings, and initially to FIGS. 4, 5, and 6, a wheel assembly in accordance with the present invention comprises a wheel body 3 including a wheel axle 31, a wheel frame 32 and a tire 33, the axle 31 is rotatably supported in the hub of the wheel frame 32 by two bearings 34 and is fixed in place by a retaining element 35. A cap 36 is engaged to the wheel frame 32 for covering and protecting the wheel axle 31.

An engaging member 6 is secured to the axle 31 and includes a body 61 having a hole 611 formed therein for engaging with tile axle 31, and includes a pair of catches 62 extended therefrom. The catches 62 each include a depression 63 formed therein and each includes a tapered free end. A leg attachment member 4 includes a square hole 43 formed therein for receiving tile catches 62, tile hole 43 includes a projection 44 extended inward therefrom for engaging with the recesses 63 so as to retain tile catches 62 within the hole 43. When the wheel body 3 is required to be disengaged from tile leg attachment member 4, it is only required to press the catches 62 toward each other so as to disengage the projection 44 from the recesses 63, the engaging member 6 can thus be easily disengaged from the leg attachment member 4.

Figure 7:
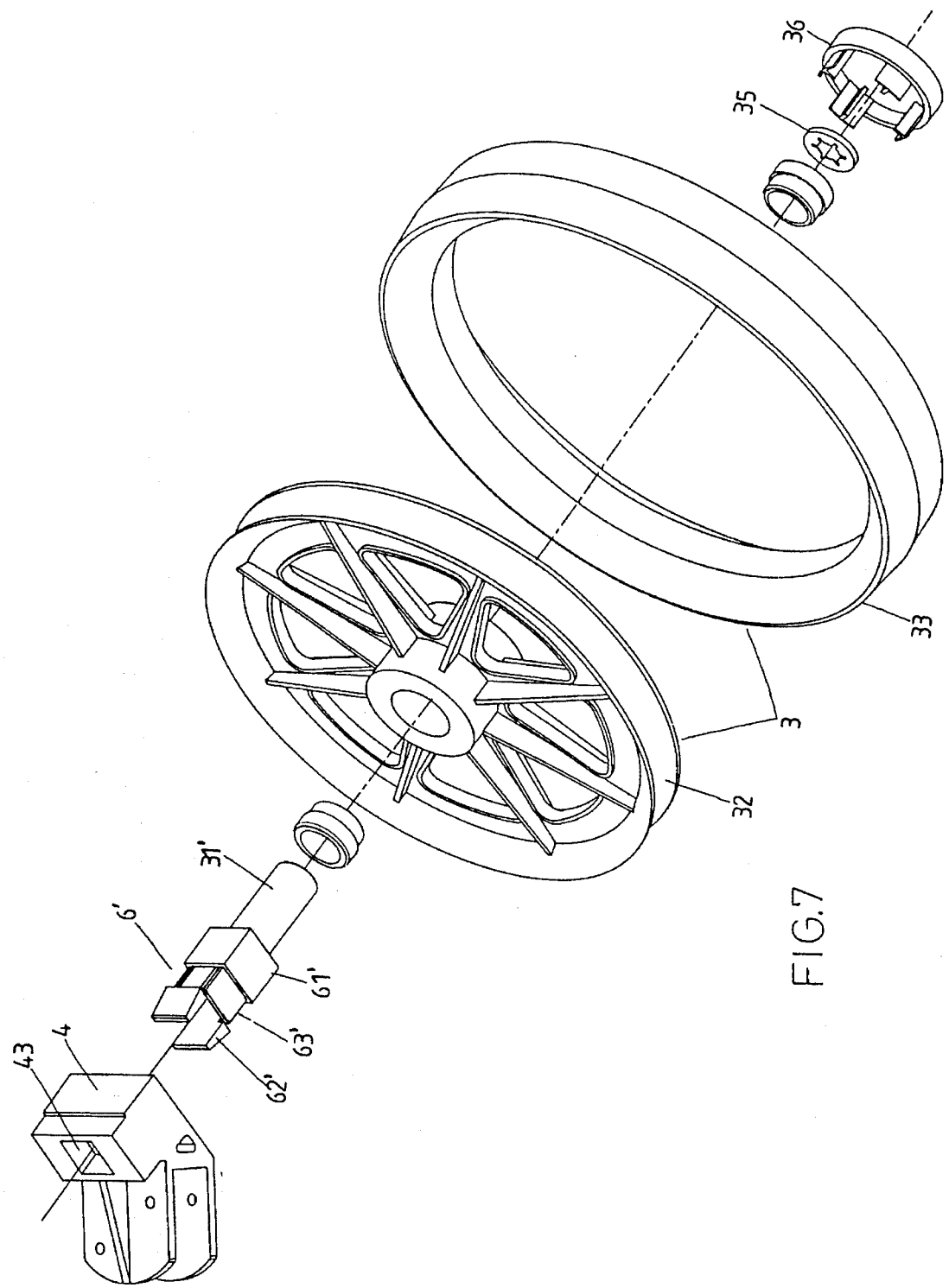
FIG. 7 is an exploded view illustrating another application of the wheel assembly.
Figure 8:
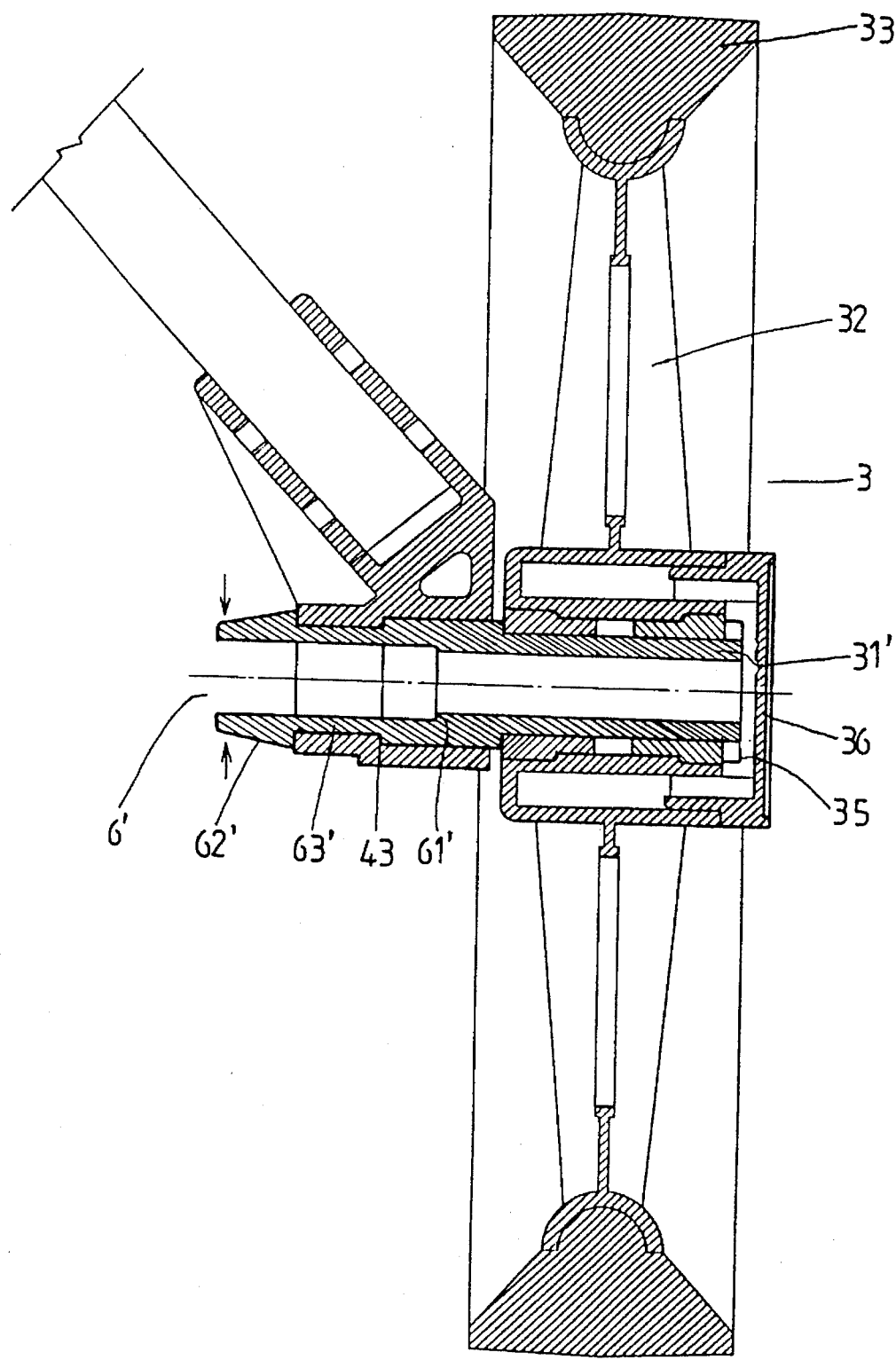
FIG. 8 is a cross sectional view of the wheel assembly as shown in FIG. 7.

Referring next to FIGS. 7 and 8, it will be seen that the invention may be accomplished by providing a wheel axle 31' that is integral to an engaging member 6'. The engaging member 6', similar to the engaging member 6 of the first preferred embodiment, includes a body 61' including a pair of catches 62' with depressions 63' formed therein.

Accordingly, the wheel assembly includes a greatly simplified configuration for facilitating assembling operation of the wheel to tile golf cart.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A releasable wheel assembly for a golf cart comprising:
   a wheel body including a hub portion, an axle being rotatably supported in said hub portion,
   a leg attachment member includes a hole formed therein, said hole being of a shape conforming to that of an engaging member, said hole releasably receiving said engaging member to releasably secure said wheel assembly to said golf cart; wherein
   said engaging member includes a pair of opposing catches extending therefrom, said catches being compresses when inserted into said hole of said leg attachment member, a depression in said engaging member fitting in an interior of said leg attachment member, the catches returning to their extended position after they have passed through said hole in said leg attachment member and abutting an inner side of a projection on said leg attachment member, a lower portion of said engaging member abutting an outer side of said projection means on said leg attachment member, so that said wheel assembly is inhibited from lateral movement, said wheel assembly being released by a user compressing said catches with his hand, thereby enabling the wheel assembly to be pulled from the leg attachment member.

2. The wheel assembly of claim 1 wherein:

said engaging member is formed with an integral axle.

* * * * *